United States Patent
Ueyama

(10) Patent No.: US 9,509,874 B2
(45) Date of Patent: Nov. 29, 2016

(54) WIRELESS COMMUNICATION DEVICE CONFIGURATION IN AN IMAGE FORMING APPARATUS

(71) Applicant: Brother Kogyo Kabushiki Kaisha, Nagoya-shi, Aichi-ken (JP)

(72) Inventor: Junki Ueyama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/580,889

(22) Filed: Dec. 23, 2014

(65) Prior Publication Data

US 2015/0181063 A1 Jun. 25, 2015

(30) Foreign Application Priority Data

Dec. 24, 2013 (JP) ................................ 2013-265459

(51) Int. Cl.
*H04N 1/00* (2006.01)

(52) U.S. Cl.
CPC ...... *H04N 1/00559* (2013.01); *H04N 1/00315* (2013.01); *H04N 2201/0055* (2013.01); *H04N 2201/0094* (2013.01)

(58) Field of Classification Search
CPC ...................... H04N 1/00559; H04N 1/00315; H04N 2201/0055; H04N 2201/0094
USPC ....................................................... 358/1.15
See application file for complete search history.

(56) References Cited

U.S. PATENT DOCUMENTS

| | | | |
|---|---|---|---|
| 6,710,891 B1 * | 3/2004 | Vraa ...................... | G03B 42/04 235/385 |
| 6,945,713 B2 * | 9/2005 | Vraa ...................... | B65H 1/266 206/455 |
| 7,657,245 B2 | 2/2010 | Nakagawa et al. | |
| 8,502,999 B2 * | 8/2013 | Kurokawa ................... | 358/1.13 |
| 2004/0184801 A1 * | 9/2004 | Vraa ...................... | B65H 1/266 396/517 |
| 2005/0200884 A1 * | 9/2005 | Arase ...................... | B41J 3/407 358/1.15 |
| 2005/0206962 A1 * | 9/2005 | Nakayama ............. | G03G 15/50 358/448 |
| 2006/0246866 A1 * | 11/2006 | Nakagawa ............... | H04B 1/40 455/301 |
| 2007/0014620 A1 * | 1/2007 | Sugimoto .............. | B41J 29/393 400/691 |

(Continued)

FOREIGN PATENT DOCUMENTS

| JP | 2003-069765 A | 3/2003 |
|---|---|---|
| JP | 2006-053477 A | 2/2006 |
| JP | 2006-311109 A | 11/2006 |

*Primary Examiner* — Ted Barnes
(74) *Attorney, Agent, or Firm* — Banner & Witcoff, Ltd.

(57) ABSTRACT

An image forming apparatus includes an image forming unit configured to form an image on a sheet, a housing configured to accommodate therein the image forming unit, a reading device, which is provided above the housing, and which is configured to read a content on the sheet, a protruding part, which protrudes from a side surface of the housing, and which is positioned within an outer edge of the reading device projected on a virtual horizontal plane when the protruding part is projected on the virtual horizontal plane, and a wireless board for a wireless communication, at least a part of the wireless board being arranged within the protruding part.

20 Claims, 10 Drawing Sheets

(56) References Cited

U.S. PATENT DOCUMENTS

| | | | |
|---|---|---|---|
| 2007/0041036 A1* | 2/2007 | Nakayama | H04N 1/00204 358/1.15 |
| 2007/0041740 A1* | 2/2007 | Sasai | 399/44 |
| 2008/0204801 A1* | 8/2008 | Kunii | B41J 29/393 358/1.15 |
| 2008/0253786 A1* | 10/2008 | Isobe et al. | 399/69 |
| 2008/0267666 A1* | 10/2008 | Shirokoshi | B41J 29/02 399/222 |
| 2008/0309987 A1* | 12/2008 | Frede | G06K 7/10702 358/435 |
| 2009/0055673 A1* | 2/2009 | Kitajima | H04N 1/00236 713/340 |
| 2011/0075229 A1* | 3/2011 | Fujiwara | H04N 1/00002 358/488 |
| 2011/0080268 A1* | 4/2011 | Kaneko | G06K 19/07345 340/10.4 |
| 2012/0026531 A1* | 2/2012 | Iguchi et al. | 358/1.14 |
| 2012/0098395 A1* | 4/2012 | Sato | H05K 5/0234 312/236 |
| 2012/0120461 A1* | 5/2012 | Oshima | H04N 1/00543 358/474 |
| 2012/0320392 A1* | 12/2012 | Asaoka | 358/1.9 |
| 2013/0141758 A1* | 6/2013 | Yoneda | G03G 15/5066 358/1.15 |
| 2014/0146334 A1* | 5/2014 | Yuzawa | H04N 1/00127 358/1.13 |
| 2014/0268203 A1* | 9/2014 | Saotome | H04N 1/00408 358/1.13 |
| 2015/0146251 A1* | 5/2015 | Ueyama | G06K 15/12 358/1.15 |

* cited by examiner

WIRELESS COMMUNICATION DEVICE CONFIGURATION IN AN IMAGE FORMING APPARATUS

CROSS-REFERENCE TO RELATED APPLICATIONS

This application claims priority from Japanese Patent Application No. 2013-265459 filed on Dec. 24, 2013, the entire subject-matter of which is incorporated herein by reference.

TECHNICAL FIELD

The disclosure relates to an image forming apparatus configured to form an image on a sheet.

BACKGROUND

There has been proposed an image forming apparatus which can be connected to a computer and the like through a wireless board by wireless communication. The wireless board is mounted to main body frames.

The main body frames are strength members provided at both sides in a horizontal direction with an image forming unit being interposed therebetween, and are provided to hold the image forming unit. In the related-art image forming apparatus, the main body frames are made of metal. For this reason, the wireless board is arranged at a notched part formed by notching a part of the main body frames.

SUMMARY

In the related-art image forming apparatus, the main body frames are positioned at both sides in the horizontal direction with the image forming unit being interposed therebetween and are configured to hold the image forming unit. That is, the main body frames are positioned at parts at which the image forming unit is covered from the horizontal direction.

For this reason, when the wireless board is simply mounted to the main body frames, the wireless board may be positioned at the part at which the image forming unit is covered from the horizontal direction. When the wireless board is arranged at the corresponding position, communication sensitivity may be lowered.

Therefore, illustrative aspects of the present invention provide an image forming apparatus capable of preventing communication sensitivity from being lowered.

According to one illustrative aspect of the present invention, there is provided an image forming apparatus includes an image forming unit configured to form an image on a sheet, a housing configured to accommodate therein the image forming unit, a reading device, which is provided above the housing, and which is configured to read a content on the sheet, a protruding part, which protrudes from a side surface of the housing, and which is positioned within an outer edge of the reading device projected on a virtual horizontal plane when the protruding part is projected on the virtual horizontal plane, and a wireless board for a wireless communication, at least a part of the wireless board being arranged within the protruding part.

According thereto, the wireless board is positioned at a place deviating from the image forming unit. Therefore, it is possible to prevent the communication sensitivity from being lowered due to the interference with the image forming unit.

Incidentally, the reference numerals denoting the respective means and the like are exemplarily to show a correspondence relation with the specific means and the like described in illustrative embodiments, which will be described later. However, it should be understood that the present invention is not limited to the specific means and the like denoted with the reference numerals.

BRIEF DESCRIPTION OF THE DRAWINGS

FIG. 3 is a perspective view of a first frame 9A, a second frame 9B and the like;

DETAILED DESCRIPTION

Figure 1:
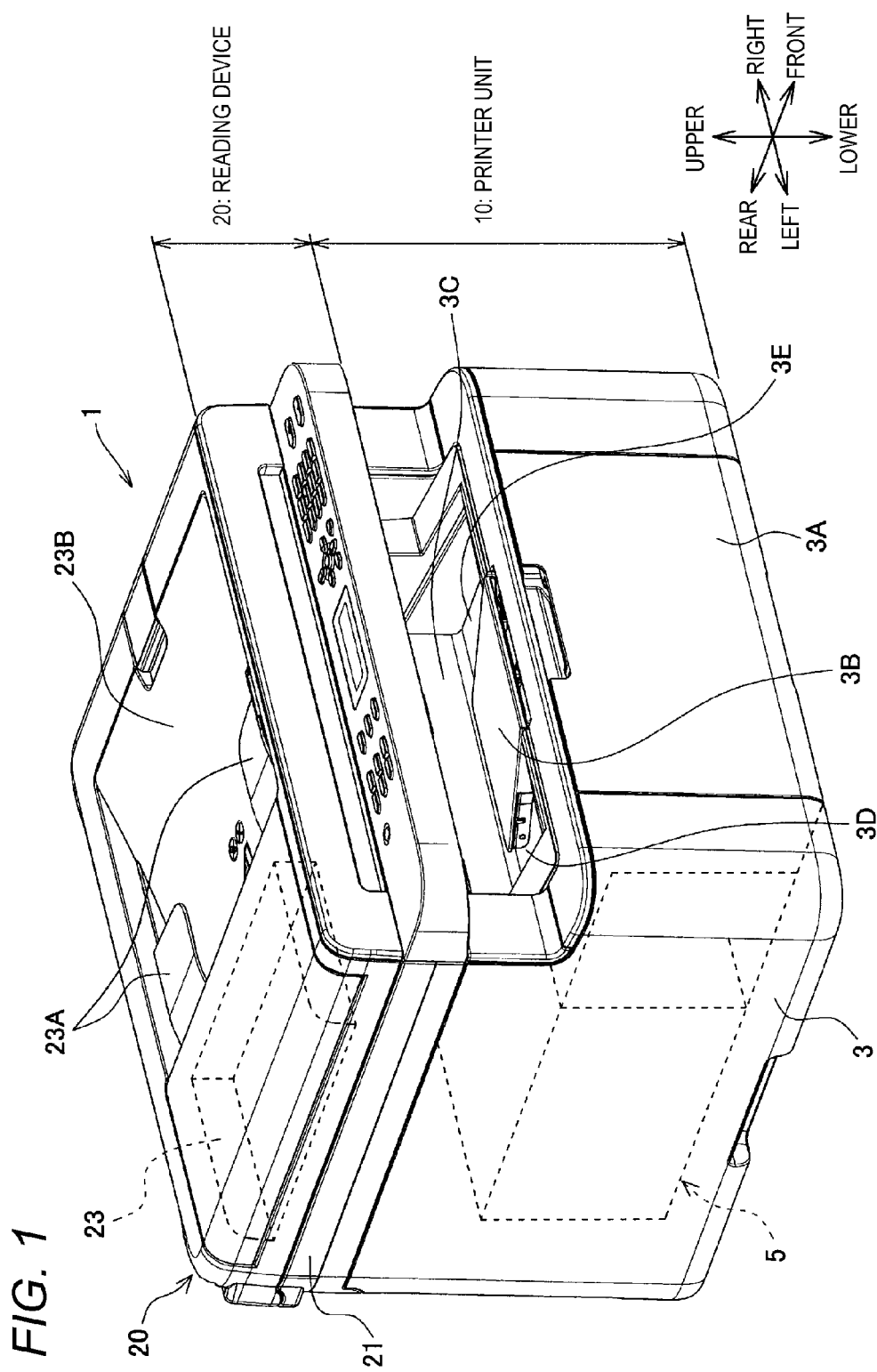
FIG. 1 is a front perspective view of an image forming apparatus 1 according to an illustrative embodiment of the present invention.

The 'illustrative embodiments of the present invention' that will be described below are exemplary. That is, the features of the present invention defined in the claims are not limited to the specific means, structures and the like described in the below illustrative embodiments.

In the illustrative embodiments, the present invention is applied to a computer-connectable image forming apparatus. The arrows indicating directions and the like denoted in the drawings are shown so as to easily understand relations between the drawings. The present invention is not limited to the directions denoted in the drawings.

A member or part denoted with a reference numeral is provided at least one, except that the terms 'a plurality of', 'two or more' and the like are used. Hereinafter, the illustrative embodiments of the present invention are described with reference to the drawings.

First Illustrative Embodiment (1) Outline of Image Forming Apparatus

As shown in FIG. 1, an image forming apparatus 1 according to this illustrative embodiment is integrally provided with a printer unit 10 having an image forming unit 5 and a reading device 20. The reading device 20 is configured to read a content on a sheet-like document. The reading device 20 is provided above a housing 3 having the image forming unit 5 accommodated therein.

A sheet feeding cover 3A is swingably mounted to a front surface-side of the housing 3. An extension tray 3B is swingably mounted to an upper surface-side of the housing 3. FIG. 1 shows a state where the sheet feeding cover 3A is closed. The sheet feeding cover 3A of a substantially rectangular plate is rotated and opened forwards about a swinging shaft (not shown) provided at a lower end thereof, which serves as a swinging center.

FIG. 1 shows a state where the extension tray 3B is closed. When the extension tray 3B of a substantially rectangular plate is rotated and opened towards, a discharge tray 3D extends forwards. The discharge tray 3D is a part to which a sheet having an image formed thereon is discharged, and is provided for a sheet discharge part 3C.

When forming an image, a user rotates forwards the sheet feeding cover 3A and the extension tray 3B to open the sheet feeding cover 3A and the extension tray 3B and places a sheet on the opened sheet feeding cover 3A. The sheet placed on the sheet feeding cover 3A is fed to the image forming unit 5 in the housing 3. Then, the sheet having an image formed thereon is placed on a placement surface 3E, which is an upper surface of the discharge tray 3D.

Figure 2:
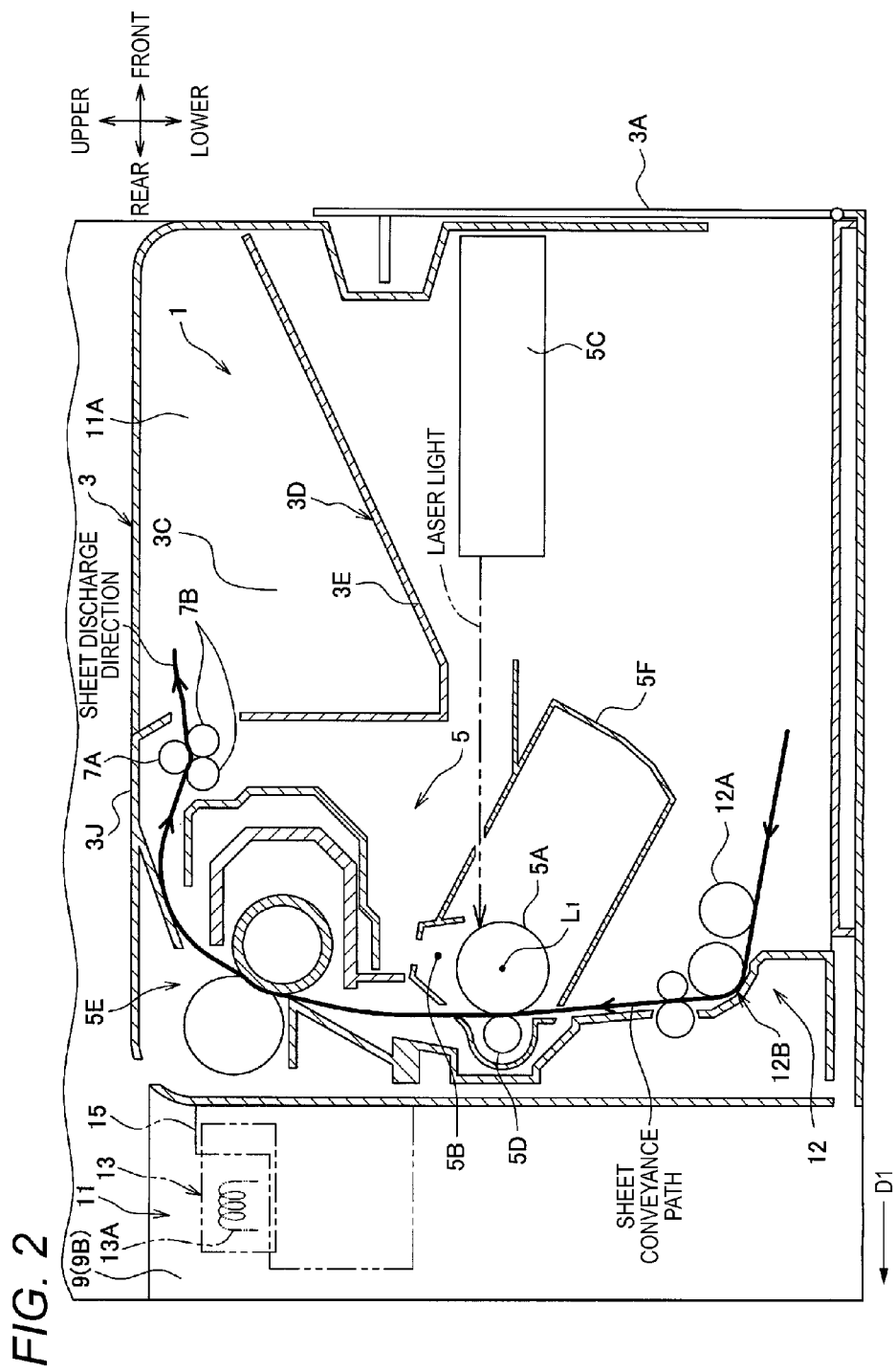
FIG. 2 is a central sectional view of a printer unit 10 according to the illustrative embodiment of the present invention.

The image forming unit 5 is configured to form an image on a sheet. The image forming unit 5 is an electrophotographic image forming unit and is provided with a photosensitive drum 5A, a charger 5B, an exposure device 5C, a transfer unit 5D, a fixing device 5E and the like, as shown in FIG. 2. The placement surface 3E is provided at a position higher than a center line of rotation L1 of the photosensitive drum 5A.

The photosensitive drum 5A is configured to carry a developer image thereon. The charger 5B is configured to charge a surface of the photosensitive drum 5A. The exposure device 5C is configured to expose the charged photosensitive drum 5A, thereby forming an electrostatic latent image. The transfer unit 5D is configured to transfer the developer image carried on the photosensitive drum 5A to the sheet.

The fixing device 5E is configured to fix the developer image transferred on the sheet. The sheet discharged from the fixing device 5E is a sheet having an image formed thereon and is discharged towards the discharge tray 3D by a discharge roller 7A. A pair of pressing rollers 7B is configured to press the sheet to the discharge roller 7A. Thereby, the sheet is discharged while curl of the sheet is corrected.

Figure 3:
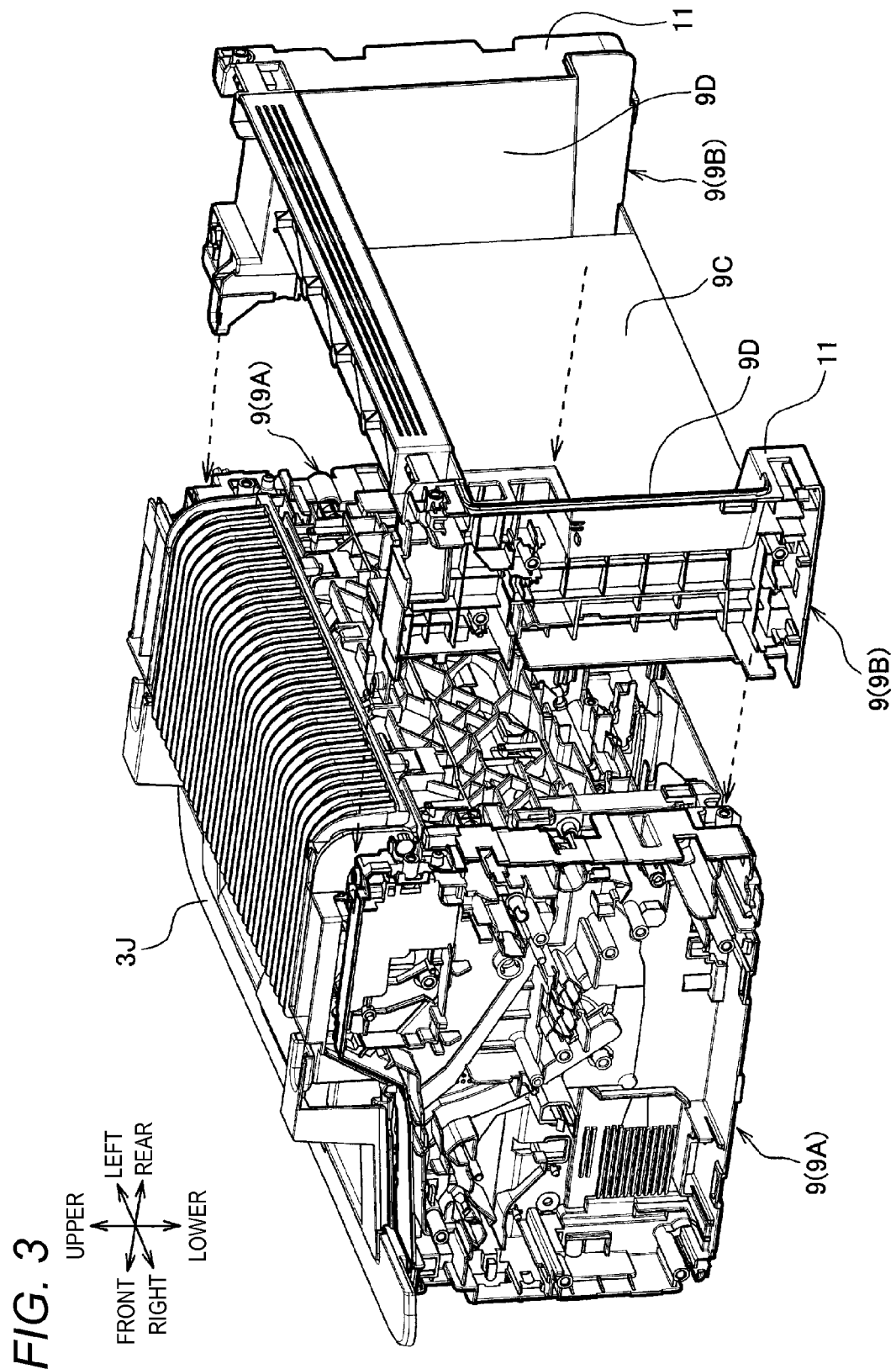

The image forming unit 5 including a process casing 5F having the photosensitive drum 5A and the exposure device 5C mounted therein, the fixing device 5E and the like is mounted to an apparatus main body. The apparatus main body is a part that is not mounted, demounted and disassembled by the user upon the normal using, such as a pair of frames 9, the housing 3 and the like, which are shown in FIG. 3.

A feeder mechanism 12 shown in FIG. 2 is configured to convey the sheet placed on the sheet feeding cover 3A towards the image forming unit 5. The feeder mechanism 12 has a pickup roller 12A, a separation part 12B and the like. The rotary members such as the pickup roller 12A, the separation part 12B and the photosensitive drum 5A of the devices configuring the image forming unit 5 are configured to rotate as a driving force is supplied thereto from a driving source 8 (refer to FIG. 9) such as an electric motor.

The pickup roller 12A is configured to rotate with contacting the sheet positioned at one end of a plurality of stacked sheets in a stacking direction. When the plurality of sheets is delivered from the pickup roller 12A, the separation part 12B separates the sheets one by one and then delivers the same towards the image forming unit 5.

(2) Structures of Frame, External Cover and the Like

As shown in FIG. 3, a pair of frames 9 is structural members having a substantial plate shape. The respective frames 9 are arranged at both sides in a horizontal direction with the image forming unit 5 such as the process casing 5F being interposed therebetween. Each frame 9 has a first frame 9A and a second frame 9B.

The first frame 9A and the second frame 9B are members made of resin and having a substantial plate shape. That is, each of the first frame 9A and the second frame 9B has a wall-shaped plate surface substantially perpendicular to a horizontal direction and a plurality of reinforcement projections protruding from the plate surface, which are integrally formed of the resin.

Incidentally, the plate surface of the first frame 9A, the plate surface of the 9b or the plate surface of the frame 9 refers to a wall-shaped plate surface substantially perpendicular to the horizontal direction. The plate surfaces are parallel with outward design surfaces of side covers 3G, 3H, which will be described later.

Therefore, the plate surface of the first frame 9A and the plate surface of the second frame 9B are parallel with each other, and the plate surface of the first frame 9A and the plate surface of the second frame 9B are parallel with the plate surface of the frame 9.

The pair of first frames 9A is mounted with the image forming unit 5 such as the processing casing 5F and the like. Each of the second frames 9B is fixed to each of the pair of first frames 9A by a fixture (not shown) such as screws.

Incidentally, each screw for fixing the second frame 9B to the first frame 9A passes through the second frame 9B and is then mounted in a female hole provided for the first frame 9A, as shown with a dotted arrow. Hereinafter, the integrated first frame 9A and second frame 9B are referred to as the frame 9.

The pair of second frames 9B is coupled by a coupling part 9C. The coupling part 9C is a plate-shaped member having a plate surface perpendicular to the plat surface of each of the second frames 9B. In this illustrative embodiment, the pair of second frames 9B and the coupling part 9C are integrally formed of the resin.

Figure 4:
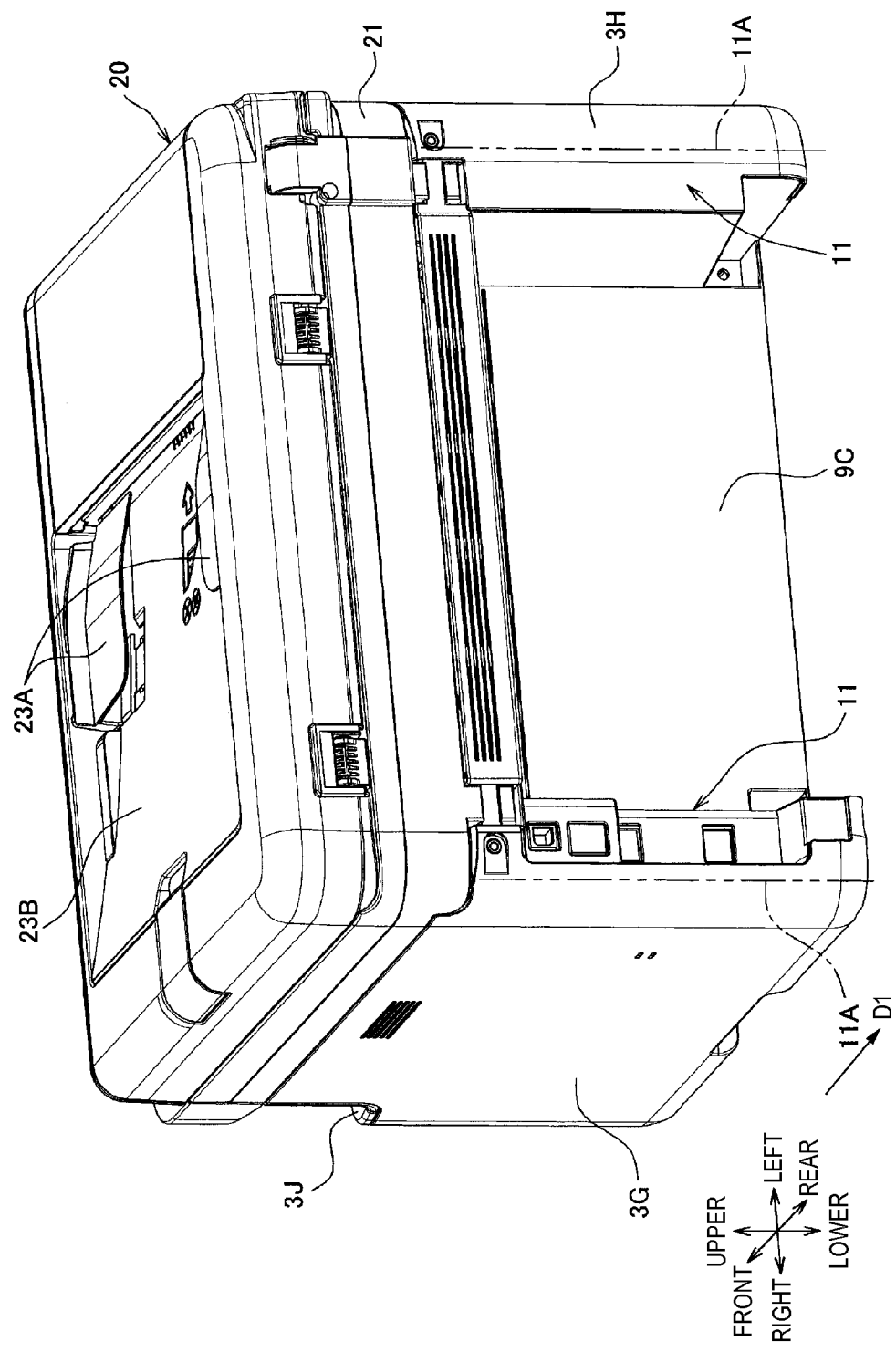
FIG. 4 is a rear perspective view of the image forming apparatus 1 according to the illustrative embodiment of the present invention.

As shown in FIG. 4, the housing 3 consists of external covers 3G to 3J and the like configured to cover the pair of frames 9 and the like from an outer side and to form an outward design surface. The external covers 3G, 3H are side covers configured to cover the pair of frames 9, i.e., the pair of first frames 9A and the pair of second frames 9B from a width direction.

The width direction is a direction in which the pair of frames 9 faces each other. In this illustrative embodiment, the width direction coincides with the left-right direction of the image forming apparatus 1. That is, the external covers 3G, 3H (hereinafter, referred to as side covers 3G, 3H) are configured to form the right and left side surfaces of side surfaces of the housing 3.

Figure 5:
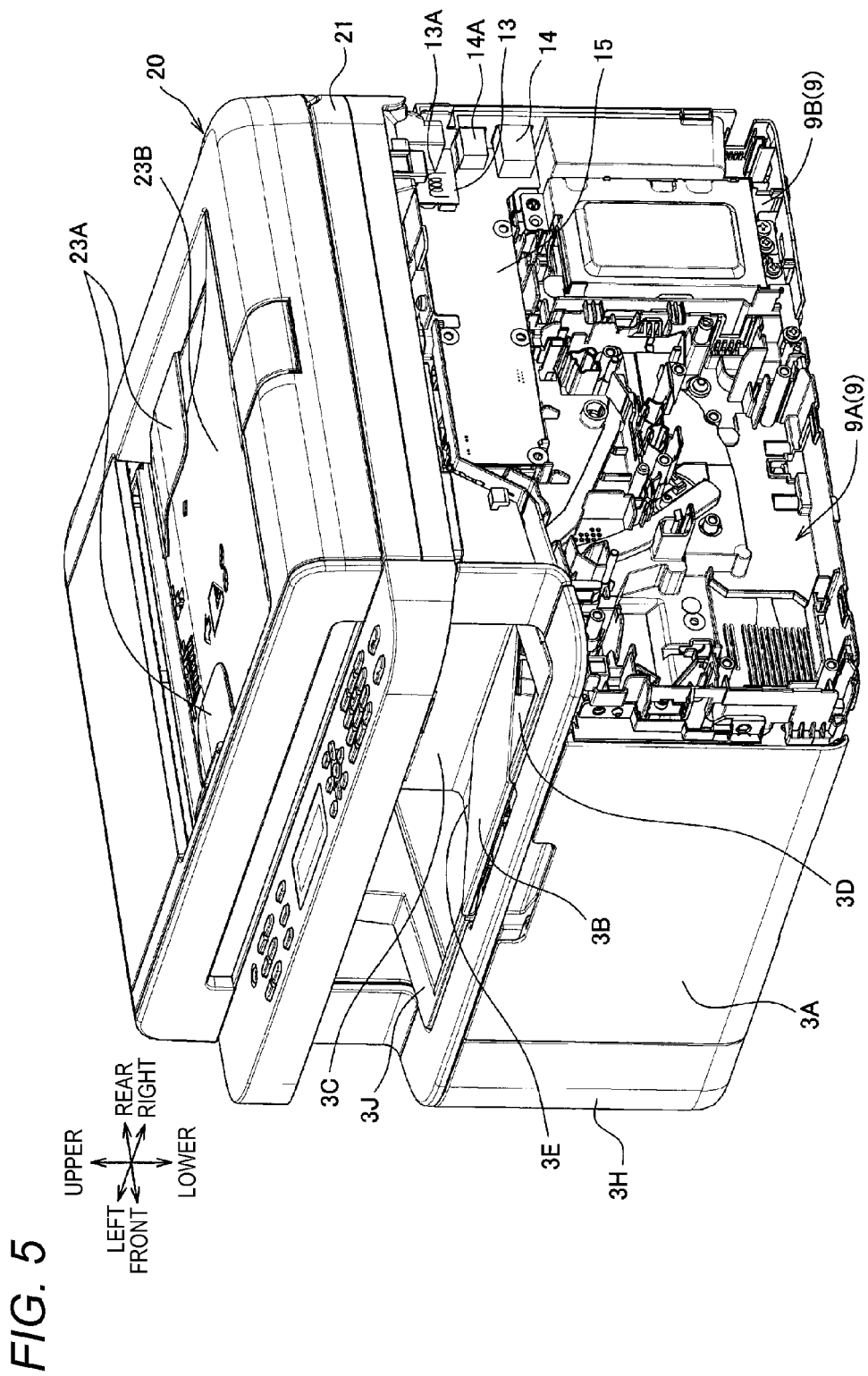
FIG. 5 illustrates the image forming apparatus 1 according to the illustrative embodiment of the present invention, from which a side cover 3G is detached.

The external cover 3J is a top cover configured to cover the pair of frames 9 from the upper and to from the discharge tray 3D and the placement surface 3E, as shown in FIG. 5.

The rear side surface of the side surfaces of the housing 3 is configured by the coupling part 9C, as shown in FIG. 4.

The rear side surface of the housing 3, i.e., the coupling part 9C is provided with at least one protruding part 11 protruding horizontally from the plate surface thereof. In this illustrative embodiment, the two protruding parts 11 are provided at both ends in the width direction.

The pair of protruding parts 11 protrudes rearwards from the rear side surface (the coupling part 9C), and ridge parts 11A connecting tip portions thereof in the protruding direction extend from a position just below the reading device 20 to a position corresponding to a lower end position of the housing 3.

Figure 6:
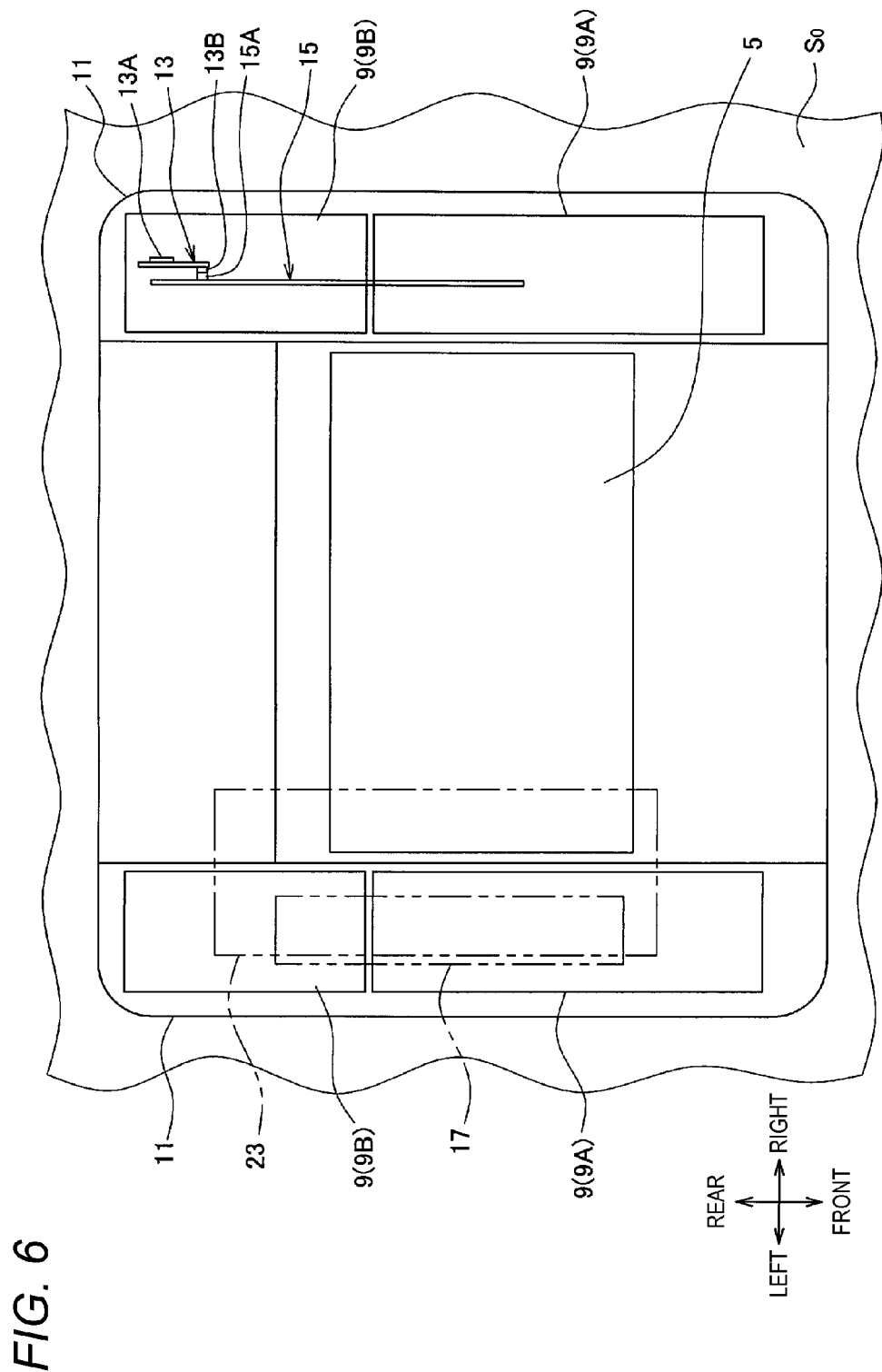
FIG. 6 illustrates a state where an image forming unit 5, a wireless board 13, a frame 9, a driving mechanism 17 and the like of the illustrative embodiment of the present invention are projected on a virtual plane $S_0$.

For this reason, as shown in FIG. 6, when the protruding parts 11 and the reading device 20 are projected on a virtual horizontal plane (hereinafter, referred to as virtual plane $S_0$), the protruding parts 11 projected on the virtual plane $S_0$ are positioned within an outer edge of the reading device 20 projected on the virtual plane $S_0$.

A protruding direction D1 of the protruding part 11 is parallel with the plate surface of the frame 9, i.e., with the side covers 3G, 3H. As shown in FIG. 4, the design surface of each of the side covers 3G, 3H continues along each protruding part 11. For this reason, in each of the side covers 3G and 3H, a part covering the first frame 9A and a part covering the second frame 9B are formed as one surface continuing to each other.

As shown in FIG. 3, each of the second frames 9B configures at least a part of each protruding part 11. Specifically, parts 9D of the pair of second frames 9B, which face each other, configure surfaces of the protruding parts 11 parallel with the protruding direction. The opposite sides to the parts 9D, which are surfaces of the protruding parts 11 parallel with the protruding direction, are configured by the side covers 3G, 3H.

Figure 7:
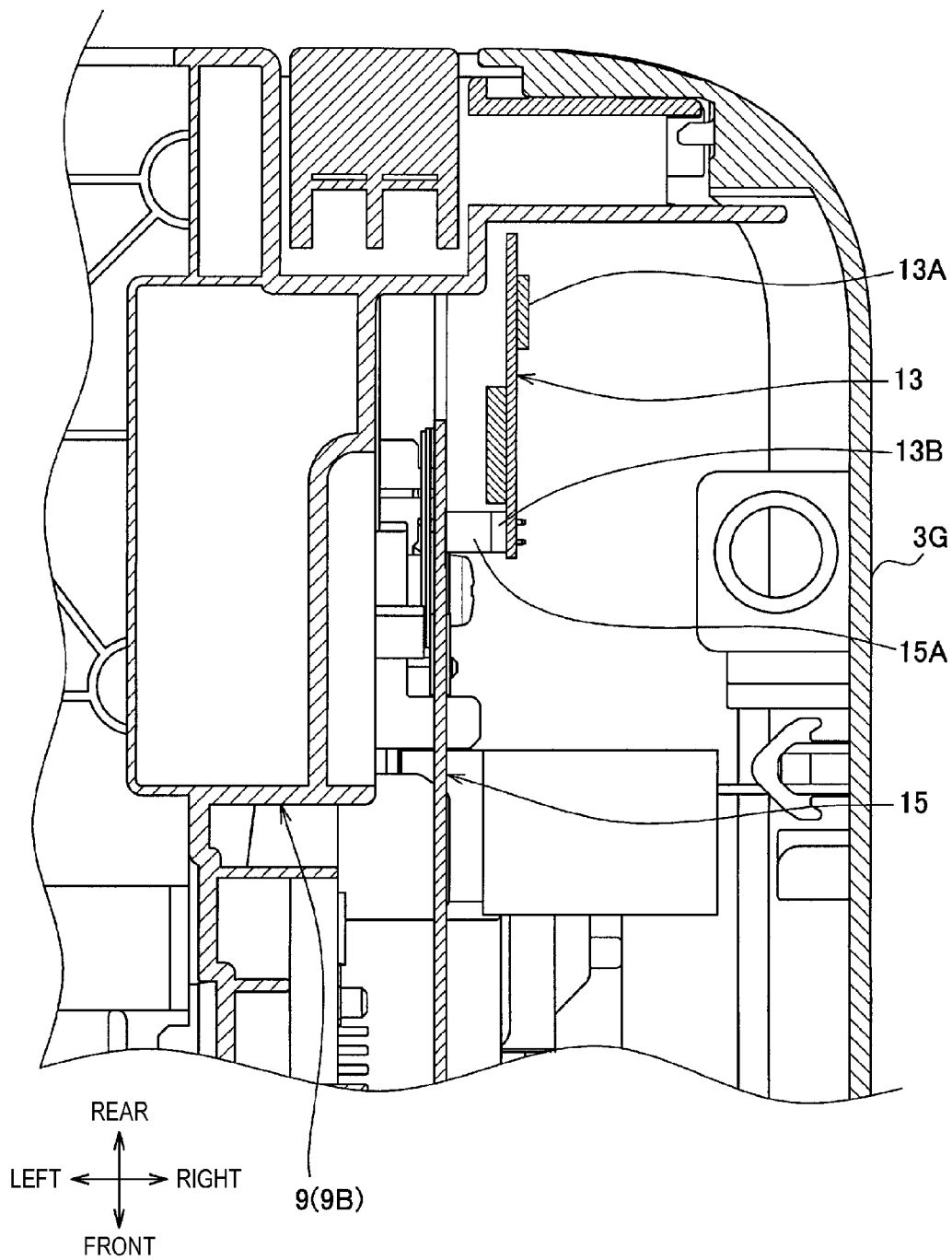
FIG. 7 illustrates a periphery of a control board 15, the wireless board 13 and the like according to the illustrative embodiment of the present invention.

In the one protruding part 11 of the pair of protruding parts 11 (in this illustrative embodiment, the protruding part 11 at the side cover 3G-side), at least a part of a wireless board 13 for wireless communication is positioned, as shown in FIG. 7. As shown in FIG. 5, the wireless board 13 has an antenna part 13A for wireless communication. At least the antenna part 13A of the wireless board 13 is positioned within the protruding part 11.

For this reason, as shown in FIG. 2, the wireless board 13 and the discharge tray 3D are located on opposite sides of the discharge roller 7A in the sheet discharge direction by the discharge roller 7A. That is, the wireless board 13 is arranged at the position deviating from the device in which the high heat is generated such as the fixing device 5E and the device in which the high voltage is generated such as the charger 5B and the transfer unit 5D.

A control board 15 is a board on which a control unit (not shown) configured to control operations of the image forming unit 5, the driving source 8 and the like is provided. As shown in FIG. 7, the wireless board 13 is electrically connected to the control board 15 without a harness (a wiring).

That is, the control board 15 is provided with a first connector part 15A. The wireless board 13 is provided with a second connector part 13B configured to be fitted with the first connector part 15A. The wireless board 13 and the control board 15 are electrically connected to each other through the first connector part 15A and the second connector part 13B.

Incidentally, in this illustrative embodiment, the second connector part 13B and the first connector part 15A are fitted with each other, so that the wireless board 13 is mounted to the control board 15. That is, the first connector part 15A and the second connector part 13B also serve as an attachment part for attaching the wireless board 13 to the control board 15.

The control board 15 is mounted on the plate surface of the one end-side (the right end-side, in this illustrative embodiment) frame of the pair of frames 9 in the width direction, which is an opposite side to the image forming unit 5, i.e., on the plate surface of the frame 9 facing the external cover 3G. The control board 15 and the wireless board 13 are arranged so that board surfaces thereof are parallel with the plate surface of the frame 9.

For this reason, a fitting direction for fitting the second connector part 13B to the first connector part 15A is parallel with the direction orthogonal to the plate surface of the frame 9, i.e., the width direction. The first connector part 15A and the second connector part 13B are arranged within the protruding part 11.

Incidentally, the description 'the first connector part 15A, the antenna part 13A and the like are arranged within the protruding part 11' means that when projecting the first connector part 15A, the antenna part 13A and the protruding part 11 onto the virtual plane $S_0$, the projected first connector part 15A, antenna part 13A and the like are positioned within an outer edge of the projected protruding part 11, as shown in FIG. 6.

Figure 8:
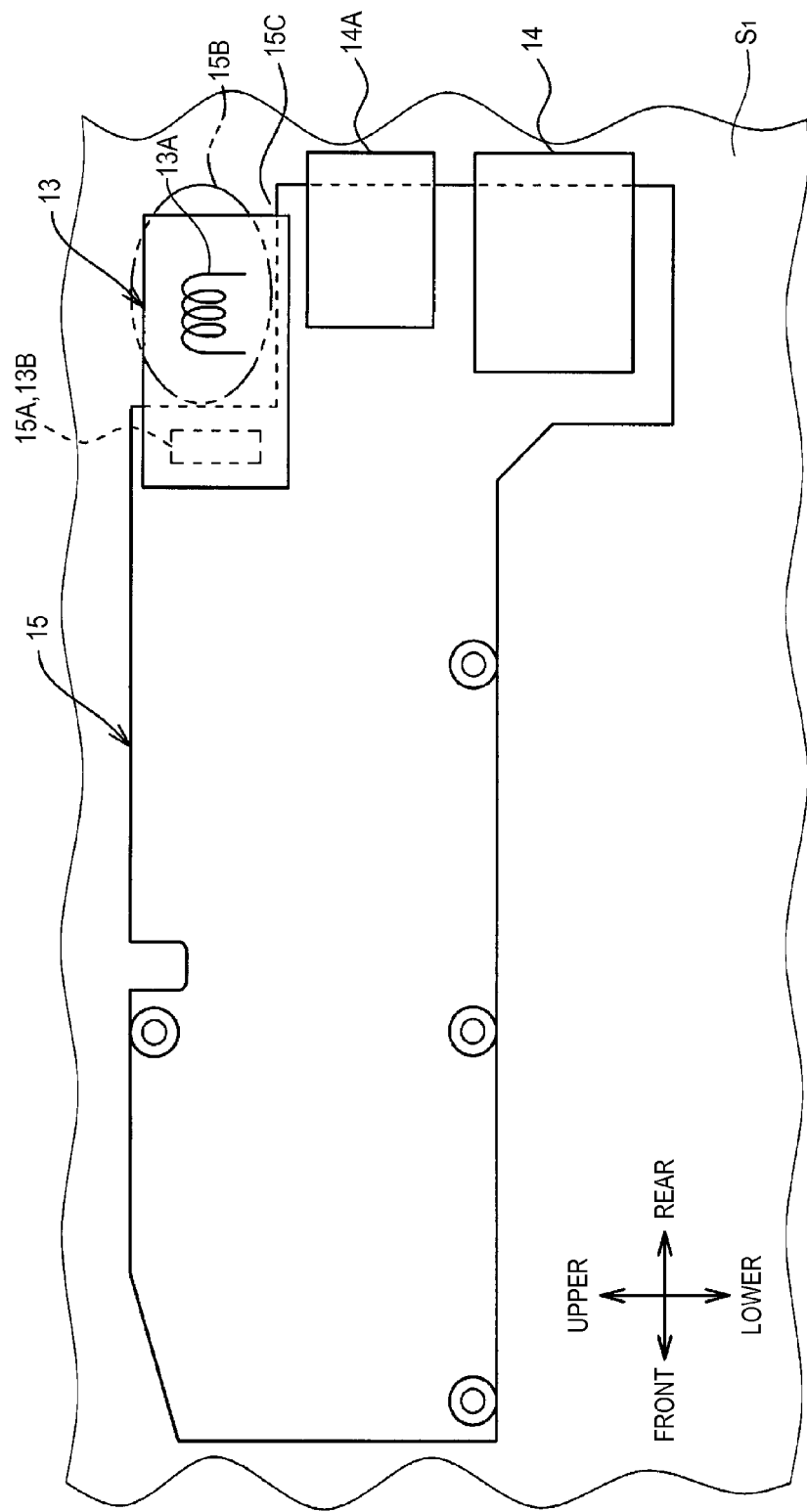
FIG. 8 illustrates an arrangement relation between the control board 15 and the wireless board 13 according to the illustrative embodiment of the present invention.

As shown in FIG. 7, the antenna part 13A is arranged at a deviating position with respect to the control board 15 in the direction (in this illustrative embodiment, the front-rear direction of the image forming apparatus 1) parallel with the protruding direction of the protruding part 11. Specifically, as shown in FIG. 8, when the wireless board 13 is attached to the control board 15, the control board 15 does not exist at a part 15B corresponding to at least the antenna part 13A.

For this reason, a recess portion 15C recessed in the protruding direction (the front end-side, in FIG. 8) is provided at the part 15B-side of an end portion (a rear end, in FIG. 8) of the control board 15, which corresponds to the antenna part 13A. That is, when the antenna part 13A and the recess portion 15C are projected on a virtual plane $S_1$ parallel with the plate surface of the control board 15 at a state where the wireless board 13 is mounted to the control board 15, the projected antenna part 13A is positioned in the projected recess portion 15C. In one example, the recess portion 15C forms a cutout.

A wire board 14 is arranged at a deviating position with respect to the wireless board 13 in the vertical direction. The wire board 14 is provided to perform a wired communication through a cable such as a LAN cable. In this illustrative embodiment, the wireless board 13 is arranged at a position deviating upwardly with respect to the wire board 14.

Incidentally, a connector board 14A such as a USB connector is arranged between the wireless board 13 and the wire board 14. The wire board 14 and the connector board 14A are directly connected to the control board 15 by a soldering without through a connector, a harness and the like.

Figure 9:
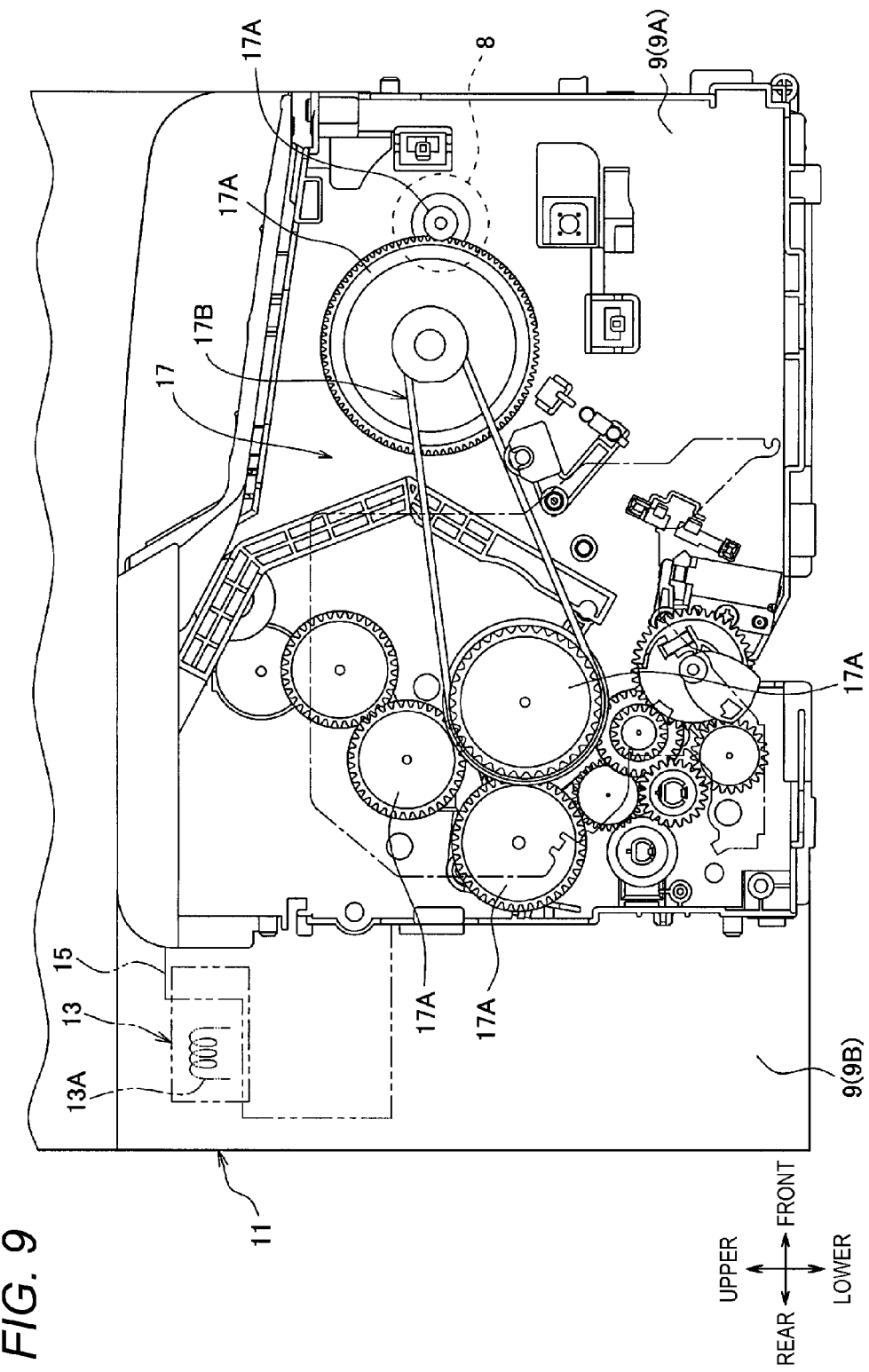
FIG. 9 illustrates the driving mechanism 17 according to the illustrative embodiment of the present invention.

A driving mechanism 17 is arranged on the other end-side (the left end-side, in this illustrative embodiment) frame of the pair of frames 9 in the width direction, as shown in FIG. 9. As shown in FIG. 6, the driving mechanism 17 projected on the virtual plane $S_0$ is located across the image forming unit 5 projected on the virtual plane $S_0$ from the wireless board 13 projected on the virtual plane $S_0$.

The driving mechanism 17 is configured to supply a driving force generated from the driving source 8 to the devices configuring the image forming unit 5 such as the photosensitive drum 5A. Incidentally, in this illustrative embodiment, the driving mechanism 17 includes a plurality of gears 17A, an endless belt 17B such as a toothed belt and a V belt, and the like.

(3) Structure and the Like of Reading Device

Figure 10:
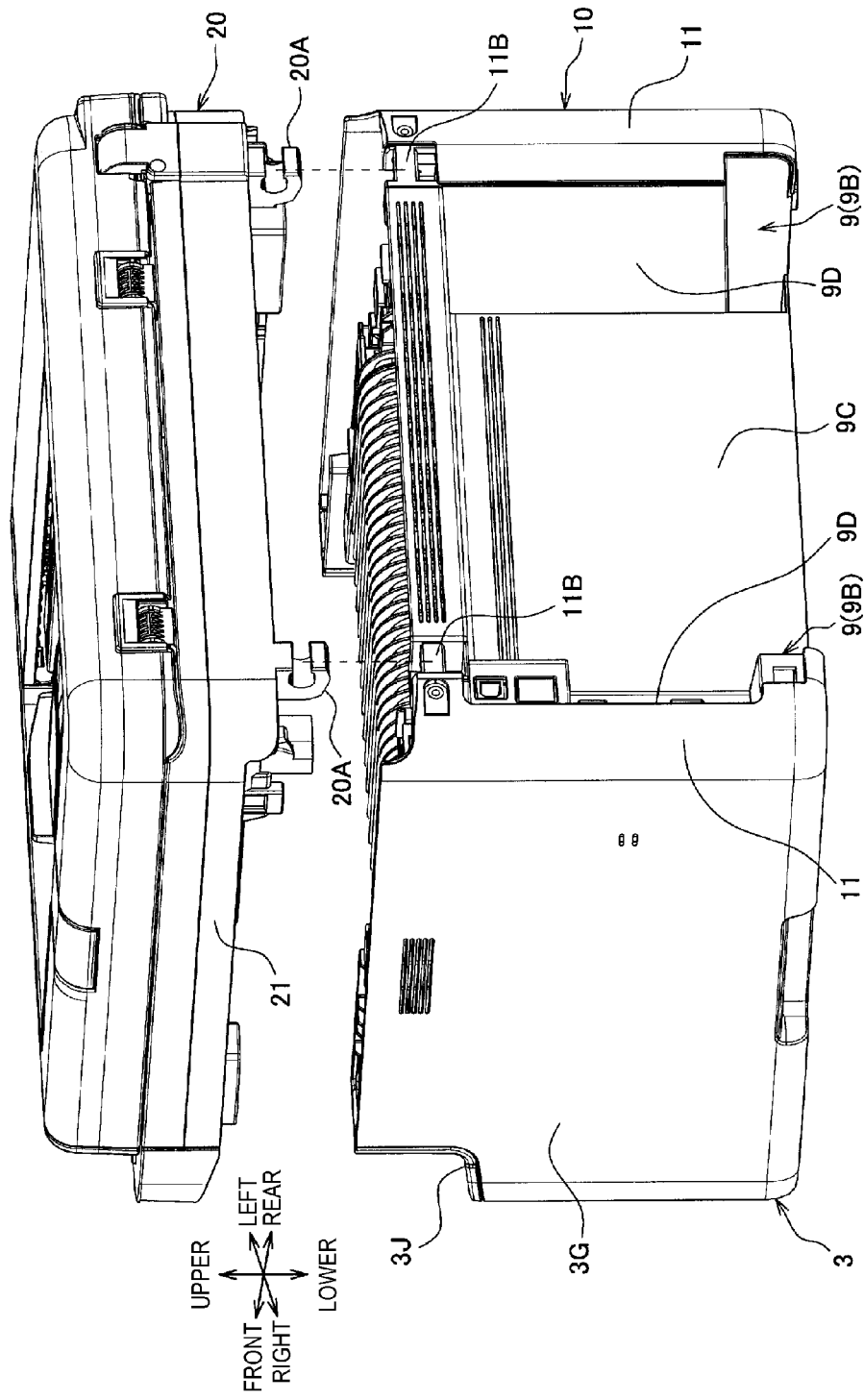
FIG. 10 illustrates a relation between a reading device 20 and a support part 11B according to the illustrative embodiment of the present invention.

As shown in FIG. 10, support parts 11B configured to support the reading device 20 are provided at upper end sides of the pair of protruding parts 11, i.e., the second frames 9B. The pair of support parts 11B is configured to be swingably engaged with hook-shaped engaging parts 20A provided for the reading device 20.

That is, the pair of support parts 11B is configured to swingably support the reading device 20 to the printer unit 10. The reading device 20 is configured to swing between a closed position at which the upper side of the sheet discharge part 3C is closed and an opened position at which the upper side of the sheet discharge part 3C is opened.

When the reading device 20 is located at the closed position, the external cover 3J and the side covers 3G, 3H serve as a strut part configured to hold the reading device 20 in cooperation with the support parts 11B. The closed position is set at a position at which a user can easily pull out the discharged sheet when the user puts a hand into the sheet discharge part 3C at a state where the reading device 20 is located at the closed position.

The reading device 20 has a conveyed document reading function and a placed document reading function. The conveyed document reading function is a function of reading a document being conveyed. The placed document reading function is a function of reading a document placed on a placement surface (not shown) of a document platen 21, as shown in FIG. 1.

An auto document feeder mechanism 23 is configured to convey the document placed on a document tray 23A towards a reading unit (not shown) of the reading device 20 and to discharge the read document to a sheet discharge tray 23B. The auto document feeder mechanism 23 is arranged above the other end-side (the left end-side, in this illustrative embodiment) of the discharge tray 3D in the width direction.

That is, as shown in FIG. 6, the auto document feeder mechanism 23 projected on the virtual plane $S_0$ is located across the image forming unit 5 projected on the virtual plane $S_0$ from to the wireless board 13 projected on the virtual plane $S_0$.

(4) Advantages of Image Forming Apparatus of Illustrative Embodiment

The illustrative embodiment has a feature that the protruding parts 11 projected on the virtual plane $S_0$ are positioned within the outer edge of the reading device 20 projected on the virtual plane $S_0$ and at least a part of the wireless board 13 is arranged within the protruding part 11.

Thereby, in this illustrative embodiment, the wireless board 13 is positioned at the place deviating from the image forming unit 5. Therefore, it is possible to prevent communication sensitivity from being lowered due to the interference with the image forming unit 5.

The illustrative embodiment has a feature that the antenna part 13A is arranged at the deviating position with respect to the control board 15 in the direction parallel with the protruding direction of the protruding part 11. Thereby, it is possible to prevent the communication sensitivity from being lowered due to the interference with the control board 15.

In this illustrative embodiment, since the end portion of the end portions of the control board 15, which is at the part 15B corresponding to the antenna part 13A, is provided with the recess portion 15C recessed in the protruding direction, it is possible to easily arrange the antenna part 13A at the deviating position with respect to the control board 15.

The illustrative embodiment has a feature that the frames 9 are made of resin. Therefore, it is possible to prevent the communication sensitivity from being lowered due to the interference with the frames 9.

The illustrative embodiment has a feature that the wire board 14 is arranged at the deviating position with respect to the wireless board 13 in the vertical direction. Therefore, it is possible to prevent the communication sensitivity from being lowered due to the interference with the wire board 14.

The illustrative embodiment has a feature that the image forming unit 5 is an electrophotographic image forming unit having the fixing device 5E configured to heat the developer transferred to the sheet. In this illustrative embodiment, since the fixing device 5E and the wireless board 13 are spaced, it is possible to prevent the wireless board 13 from being damaged due to the heat of the fixing device 5E.

This illustrative embodiment has a feature that the auto document mechanism 23 projected on the virtual plane $S_0$ is located across to the image forming unit 5 projected on the virtual plane $S_0$ from the wireless board 13 projected on the virtual plane $S_0$. Thereby, since the auto document feeder mechanism 23 and the wireless board 13, which may cause the communication noise, are spaced, it is possible to prevent the communication sensitivity from being lowered.

Other Illustrative Embodiments

In the above illustrative embodiment, the image forming apparatus 1 has the wireless board 13 upon shipment thereof by a manufacturer. However, the present invention is not limited thereto. For example, the present invention can be also applied to an image forming apparatus in which the wireless board 13 is set as an option.

That is, in an image forming apparatus in which the wireless board 13 is set as an option, the control board 15 is provided with the first connector part 15A. However, upon the shipment by the manufacturer, the wireless board 13 may not be mounted to the first connector part 15A. Regarding this, the present invention can be also applied to an image forming apparatus in which the wireless board 13 is not mounted to the first connector part 15A.

In the above illustrative embodiment, the first connector part 15A and the second connector part 13B are fitted with each other without the harness. However, the present invention is not limited thereto. For example, the control board 15 and the wireless board 13 may be connected by the harness.

In the above illustrative embodiment, the wireless board 13 is parallel with the plate surface of the frame 9. However, the present invention is not limited thereto. For example, the wireless board 13 may be arranged on the upper end-side of the frame 9 so that the wireless board 13 is orthogonal to the plate surface of the frame 9.

In the above illustrative embodiment, the control board 15 is arranged at the deviating position with respect to the antenna part 13A. However, the present invention is not limited thereto. For example, when the antenna part 13A and the control board 15 are projected on a virtual plane orthogonal to the width direction, the projected antenna part 13A and control board 15 may overlap with each other.

In the above illustrative embodiment, at least the antenna part 13A is positioned within the protruding part 11. However, the present invention is not limited thereto. For example, at least a part of the wireless board 13 may be positioned within the protruding part 11.

In the above illustrative embodiment, the image forming unit 5 is a monochrome electrophotographic type. However, the present invention is not limited thereto. For example, the image forming unit 5 may be a color electrophotographic type or an inkjet type.

Also, the present invention has only to match the gist of the invention defined in the claims and is not limited to the above illustrative embodiments.

As has been described, the following matters are disclosed in this specification.

(1) An image forming apparatus including: an image forming unit configured to form an image on a sheet; a housing configured to accommodate therein the image forming unit; a reading device, which is provided above the housing, and which is configured to read a content on the sheet; a protruding part, which protrudes from a side surface of the housing, and which is positioned within an outer edge of the reading device projected on a virtual horizontal plane when the protruding part is projected on the virtual horizontal plane; and a wireless board for a wireless communication, at least a part of the wireless board being arranged within the protruding part.

(2) The image forming apparatus according to (1), further including a pair of frames provided at both sides thereof with the image forming unit being interposed therebetween, each of the frames having a plate shape, wherein a protruding direction of the protruding part is parallel with plate surfaces of the frames.

(3) The image forming apparatus according to (1) or (2), wherein a side surface of side surfaces of the housing, which is parallel with a protruding direction of the protruding part, continues along the protruding part.

(4) The image forming apparatus according to any one of (1) to (3), wherein the protruding part has a support part configured to support the reading device.

(5) The image forming apparatus according to any one of (1) to (4), wherein the wireless board is provided with an antenna part, and wherein at least the antenna part is positioned within the protruding part.

(6) The image forming apparatus according to (5), further including a control board that is electrically coupled to the wireless board without a harness, wherein the antenna part is arranged at a position deviated from the control board in a direction parallel with a protruding direction of the protruding part.

(7) The image forming apparatus according to (6), wherein one end portion of the control board corresponding to the antenna part is provided with a recess portion recessed in the protruding direction.

(8) The image forming apparatus according to (2), wherein the frames are made of resin.

(9) The image forming apparatus according to any one of (2), (7) and (8), wherein the frames include: a pair of first frames having the image forming unit mounted thereto; and a pair of second frames fixed to each of the pair of first frames and configuring at least a part of the protruding part.

(10) The image forming apparatus according to claim 9, further including a coupling part configured to connect the pair of second frames.

(11) The image forming apparatus according to any one of (2) and (7) to (10), wherein the wireless board is parallel with the frames.

(12) The image forming apparatus according to any one of (1) to (11), further including a wire board for a wired communication, wherein the wire board is arranged at a position deviated from the wireless board in a vertical direction.

(13) The image forming apparatus according to (12), wherein the wireless board is arranged at a position deviated upwardly from the wired board.

(14) The image forming apparatus according to any one of (1) to (13), further including: a discharge tray, which is provided on an upper surface of the housing, and on which the sheet is placed; and a discharge roller configured to discharge the sheet having an image formed thereon towards the discharge tray, wherein the wireless board and the discharge tray are located on opposite sides of the discharge roller in a sheet discharge direction by the discharge roller.

(15) The image forming apparatus according to any one of (1) to (14), wherein the image forming unit is an electrophotographic type having a fixing device configured to heat developer transferred to the sheet.

(16) The image forming apparatus according to any one of (1) to (15), further including an auto document feeder mechanism configured to convey the sheet towards a reading unit of the reading device, wherein the auto document feeder mechanism projected on the virtual horizontal plane is located across the image forming unit projected on the virtual horizontal plane from the wireless board projected on the virtual horizontal plane.

(17) The image forming apparatus according to any one of (1) to (16), further including a driving mechanism configured to supply a driving force to the image forming unit, wherein the driving mechanism projected on the virtual horizontal plane is located across the image forming unit projected on the virtual horizontal plane from the wireless board projected on the virtual horizontal plane.

(18) The image forming apparatus according to any one of (1) to (17), further including: a discharge tray, which is provided on an upper surface of the housing, and on which the sheet is placed, wherein the image forming unit is an electrophotographic type having a fixing device configured to heat developer transferred to the sheet, and wherein the wireless board is located across the fixing device from the discharge tray.

(19) An image forming apparatus including: an image forming unit configured to form an image on a sheet; a housing configured to accommodate therein the image forming unit; a reading device, which is provided above the housing, and which is configured to read a content on the sheet; a protruding part, which protrudes from a side surface of the housing, and which is positioned within an outer edge of the reading device projected on a virtual horizontal plane when the protruding part is projected on the virtual horizontal plane; and a control board having a first connector part to which a wireless board for wireless communication is coupled, wherein the first connector part is positioned within the protruding part.

(20) An image forming apparatus including: an image forming unit configured to form an image on a sheet; a housing configured to accommodate therein the image forming unit; a reading device, which is provided above the housing, and which is configured to read a content on the sheet; a protruding part, which protrudes from a side surface of the housing, and which is positioned below the reading device within an outer edge of the reading device; and a wireless board for a wireless communication, at least a part of the wireless board being arranged within the protruding part.

What is claimed is:

1. An image forming apparatus comprising:
an image forming device configured to form an image on a sheet;
a housing configured to accommodate therein the image forming device;
a reading device, which is provided above the housing, and which is configured to read content on the sheet;
a protruding frame part, which protrudes from a side surface of the housing on one side of the image forming apparatus opposite to another side of the image forming apparatus in a width direction, and which is positioned within an outer edge of the reading device projected on a virtual horizontal plane when the protruding frame part is projected on the virtual horizontal plane, the protruding frame part having an interior space enclosed by a first side surface, a second side surface and a connecting surface extending between the first side surface and the second side surface, wherein the first side surface, the second side surface and the connecting surface are all disposed closer to the one side of the image forming apparatus than to the other side of the image forming apparatus, the first and second side surfaces being parallel to the side surface of the housing; and
a wireless board for a wireless communication, the wireless board provided with an antenna part, at least a part of the wireless board being arranged within the interior space of the protruding frame part, wherein the reading device at least partially overlaps the interior space of the protruding frame part and the wireless board when viewed from above, and wherein the antenna part is positioned below the reading device.

2. The image forming apparatus according to claim 1, further comprising a pair of frames, each being provided at a respective side of the image forming apparatus in the width direction with the image forming device being interposed therebetween, each of the frames having a plate shape,
wherein a protruding direction of the protruding frame part is parallel with plate surfaces of the frames.

3. The image forming apparatus according to claim 2, wherein the frames are made of resin.

4. The image forming apparatus according to claim 2, wherein the frames comprise:
a pair of first frames having the image forming device mounted thereto; and
a pair of second frames fixed to each of the pair of first frames and configuring at least a part of the protruding frame part.

5. The image forming apparatus according to claim 4, further comprising a coupling configured to connect the pair of second frames.

6. The image forming apparatus according to claim 2, wherein the wireless board is parallel with the frames.

7. The image forming apparatus according to claim 1, wherein the side surface of the housing, which is parallel with a protruding direction of the protruding frame part, includes the first side surface, the first side surface covering at least a portion of the protruding frame part.

8. The image forming apparatus according to claim 1, wherein the protruding frame part has a support part configured to support the reading device.

9. The image forming apparatus according to claim 1, wherein at least the antenna part is positioned within the protruding frame part.

10. The image forming apparatus according to claim 9, further comprising a control board that is electrically coupled to the wireless board without a harness,
wherein the antenna part is arranged at a position deviated from the control board in a direction parallel with a protruding direction of the protruding frame part.

11. The image forming apparatus according to claim 10, wherein one end portion of the control board corresponding to the antenna part is provided with a recess portion recessed in the protruding direction.

12. The image forming apparatus according to claim 1, further comprising a wire board for a wired communication,
wherein the wire board is arranged at a position deviated from the wireless board in a vertical direction.

13. The image forming apparatus according to claim 12, wherein the wireless board is arranged at a position deviated upwardly from the wired board.

14. The image forming apparatus according to claim 1, further comprising:
a discharge tray, which is provided on an upper surface of the housing, and on which the sheet is placed; and
a discharge roller configured to discharge the sheet having an image formed thereon towards the discharge tray,
wherein the wireless board and the discharge tray are located on opposite sides of the discharge roller in a sheet discharge direction by the discharge roller.

15. The image forming apparatus according to claim 1, wherein the image forming device is an electrophotographic type having a fixing device configured to heat developer transferred to the sheet.

16. The image forming apparatus according to claim 1, further comprising an auto document feeder mechanism configured to convey the sheet towards a reading unit of the reading device,
wherein the auto document feeder mechanism projected on the virtual horizontal plane is located across the image forming device projected on the virtual horizontal plane from the wireless board projected on the virtual horizontal plane.

17. The image forming apparatus according to claim 1, further comprising a gear mechanism configured to supply a driving force to the image forming device,
wherein the gear mechanism projected on the virtual horizontal plane is located across the image forming device projected on the virtual horizontal plane from the wireless board projected on the virtual horizontal plane.

18. The image forming apparatus according to claim 1, further comprising:
a discharge tray, which is provided on an upper surface of the housing, and on which the sheet is placed,
wherein the image forming device is an electrophotographic type having a fixing device configured to heat developer transferred to the sheet, and
wherein the wireless board is located across the fixing device from the discharge tray.

19. An image forming apparatus comprising:
an image forming device configured to form an image on a sheet;
a housing configured to accommodate therein the image forming device;
a reading device, which is provided above the housing, and which is configured to read content on the sheet;
a protruding frame part, which protrudes from a side surface of the housing on one side of the image forming apparatus opposite to another side of the image forming apparatus in a width direction, and which is positioned within an outer edge of the reading device projected on a virtual horizontal plane when the protruding frame part is projected on the virtual horizontal plane, the protruding frame part having an interior space enclosed by a first side surface, a second side surface and a connecting surface extending between the first side surface and the second side surface, wherein the first side surface, the second side surface and the connecting surface are all disposed closer to the one side of the image forming apparatus than to the other side of the image forming apparatus, the first and second side surfaces being parallel to the side surface of the housing; and a control board having a first connector part to which a wireless board for wireless communication is coupled, the wireless board being provided with an antenna part, the antenna part being positioned below the reading device, wherein the first connector part is positioned within interior space of the protruding frame part, the reading device at least partially overlapping interior space of the protruding frame part and the first connector part when viewed from above.

20. An image forming apparatus comprising:

an image forming device configured to form an image on a sheet;

a housing configured to accommodate therein the image forming device;

a reading device, which is provided above the housing, and which is configured to read content on the sheet;

a protruding frame part, which protrudes from a side surface of the housing on one side of the image forming apparatus opposite to another side of the image forming apparatus in a width direction, and which is positioned below the reading device and within an outer edge of the reading device, the protruding frame part having an interior space enclosed by a first side surface, a second side surface and a connecting surface extending between the first side surface and the second side surface, wherein the first side surface, the second side surface and the connecting surface are all disposed closer to the one side of the image forming apparatus than to the other side of the image forming apparatus, the first and second side surfaces being parallel to the side surface of the housing; and a wireless board for a wireless communication, the wireless board being provided with an antenna part, at least a part of the wireless board being arranged within the interior space of the protruding frame part, the reading device at least partially overlapping the interior space of the protruding frame part and the wireless board when viewed from above, and wherein the antenna part is positioned below the reading device.

* * * * *